United States Patent [19]
Reuscher

[11] Patent Number: 6,136,374
[45] Date of Patent: Oct. 24, 2000

[54] METHOD AND APPARATUS FOR COATING VENTED BRAKE ROTORS

[76] Inventor: Craig J. Reuscher, 1560 N. Sandburg Ter., Chicago, Ill. 60610

[21] Appl. No.: 09/417,572

[22] Filed: Oct. 14, 1999

[51] Int. Cl.[7] .............................. B05D 1/02; B05D 3/02; B05D 3/12; B05D 7/22

[52] U.S. Cl. .................... 427/233; 427/238; 427/240; 427/295; 427/346; 427/372.2; 427/425; 188/218 XL

[58] Field of Search ............................ 427/233, 236, 427/238, 240, 295, 346, 372.2, 424, 425, 476, 481; 118/306, 320; 188/218 R, 218 XL

[56] References Cited

U.S. PATENT DOCUMENTS

| | | | |
|---|---|---|---|
| 3,247,004 | 4/1966 | Dosser | 117/18 |
| 4,987,001 | 1/1991 | Knobbe et al. | 427/28 |
| 5,407,035 | 4/1995 | Cole et al. | 188/218 XL |
| 5,686,144 | 11/1997 | Thebault et al. | 427/282 |

*Primary Examiner*—Shrive Beck
*Assistant Examiner*—Michael Barr
*Attorney, Agent, or Firm*—Lloyd L. Zickert

[57] ABSTRACT

Method and apparatus for applying a protective coating to the surfaces of air vents in a vented brake rotor wherein the method includes the steps of rotating the rotor, directing coating material along with a stream of air toward the inlets of the vents to flood the vents with coating material to coat the surfaces, applying a suction to the outlets of the vents to remove and recover the excess material, and curing the coating. The apparatus includes fixtures for mounting the rotors that are driven to rotate the rotors during the coating operation, and for automatic operation a conveyer for advancing the rotors through a vent coating station, an exterior coating station for coating exterior rotor surfaces, and a curing station.

18 Claims, 8 Drawing Sheets

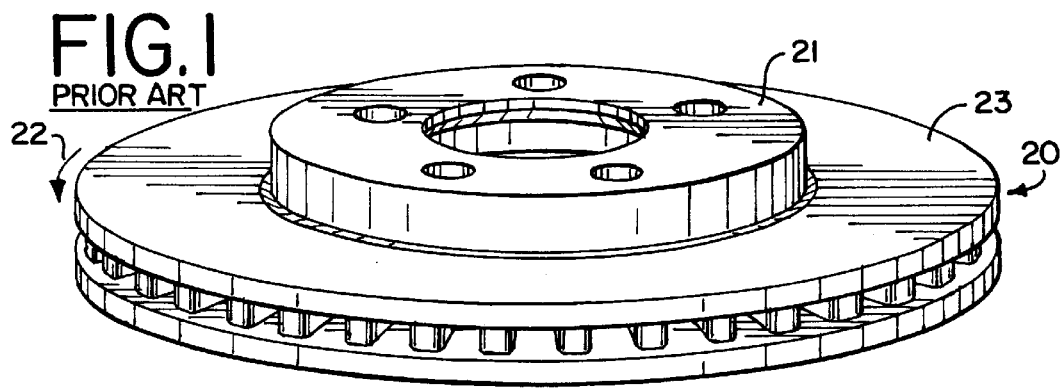
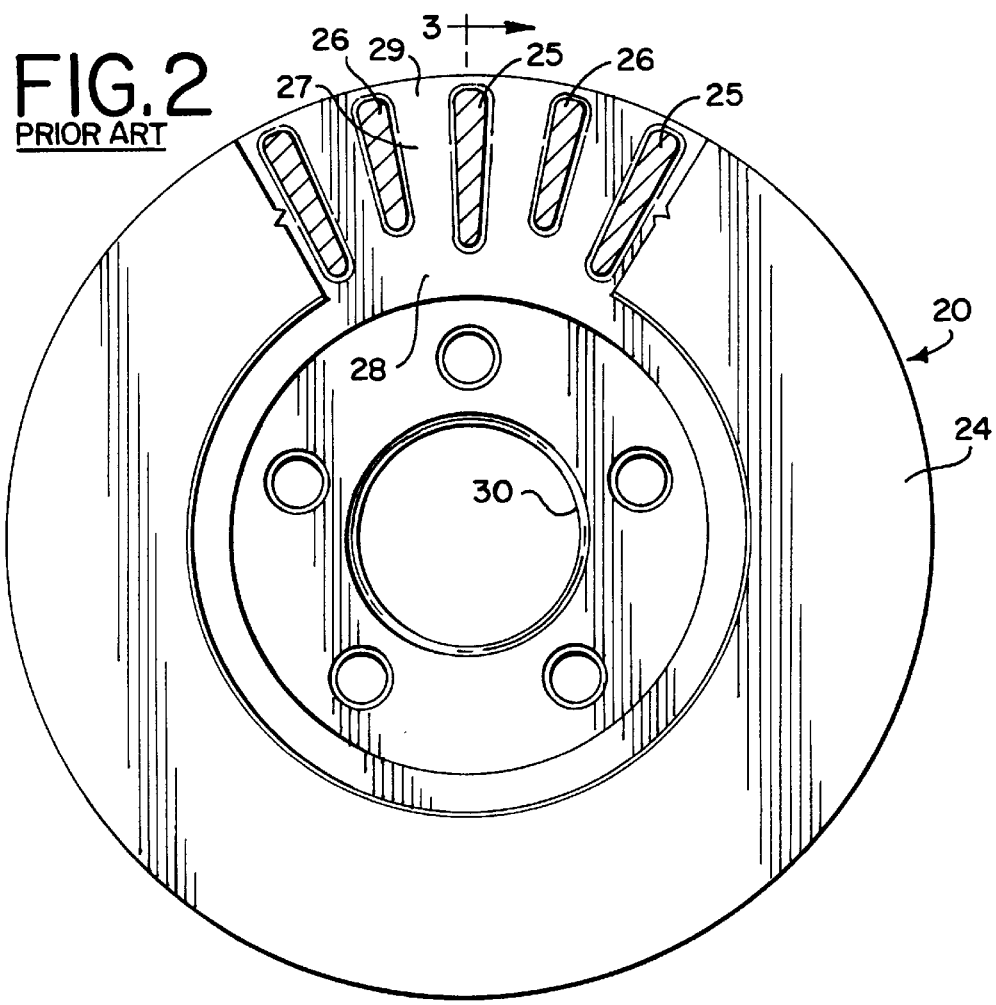
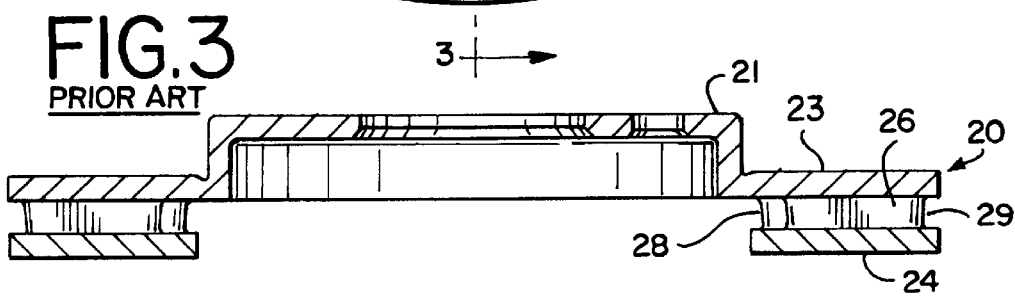

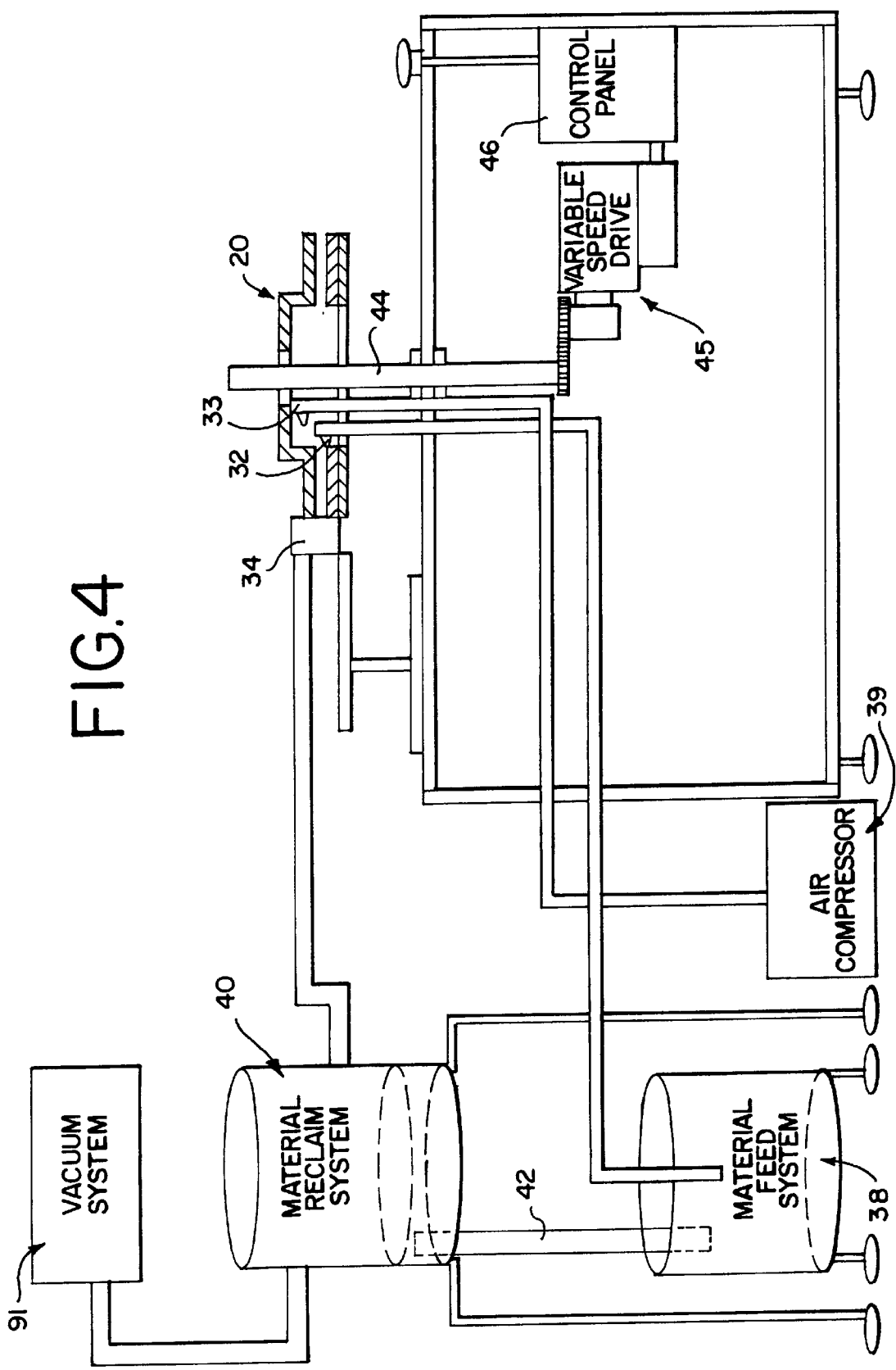

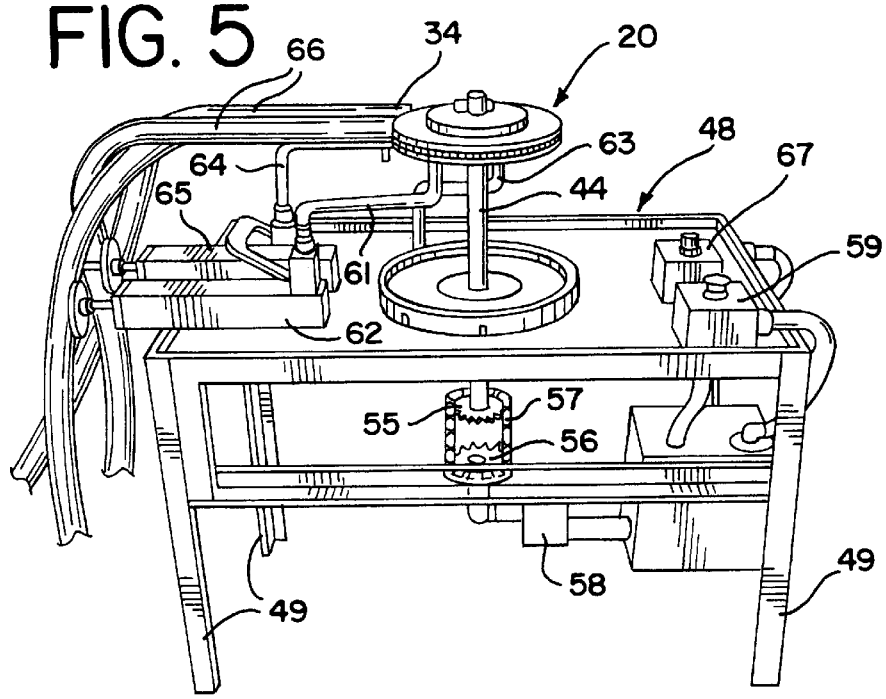
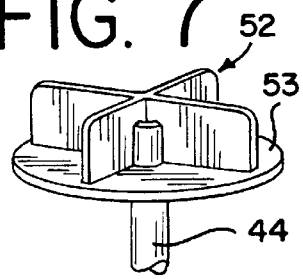
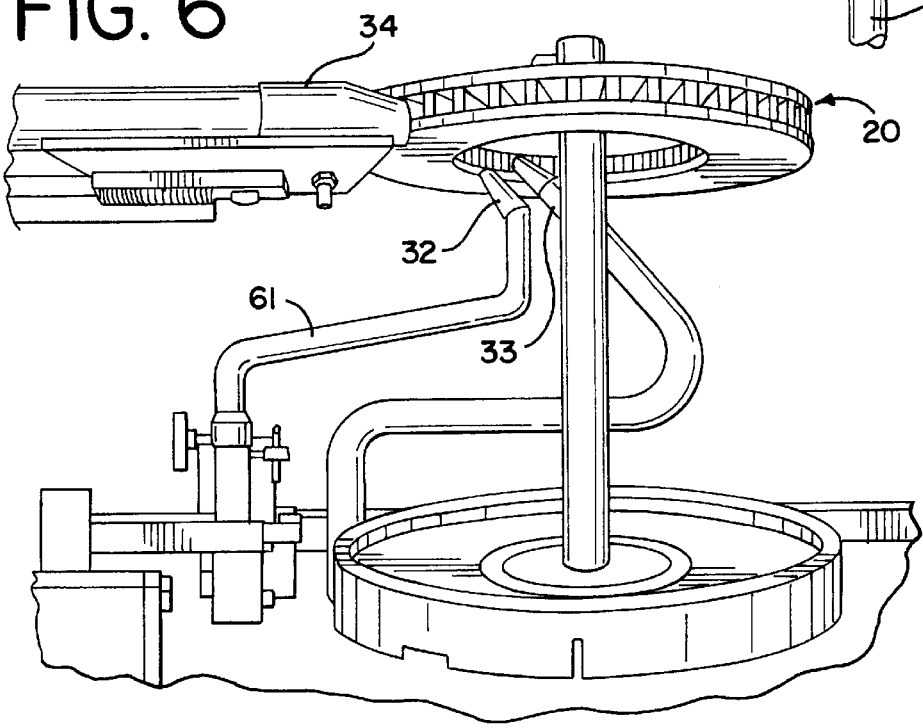

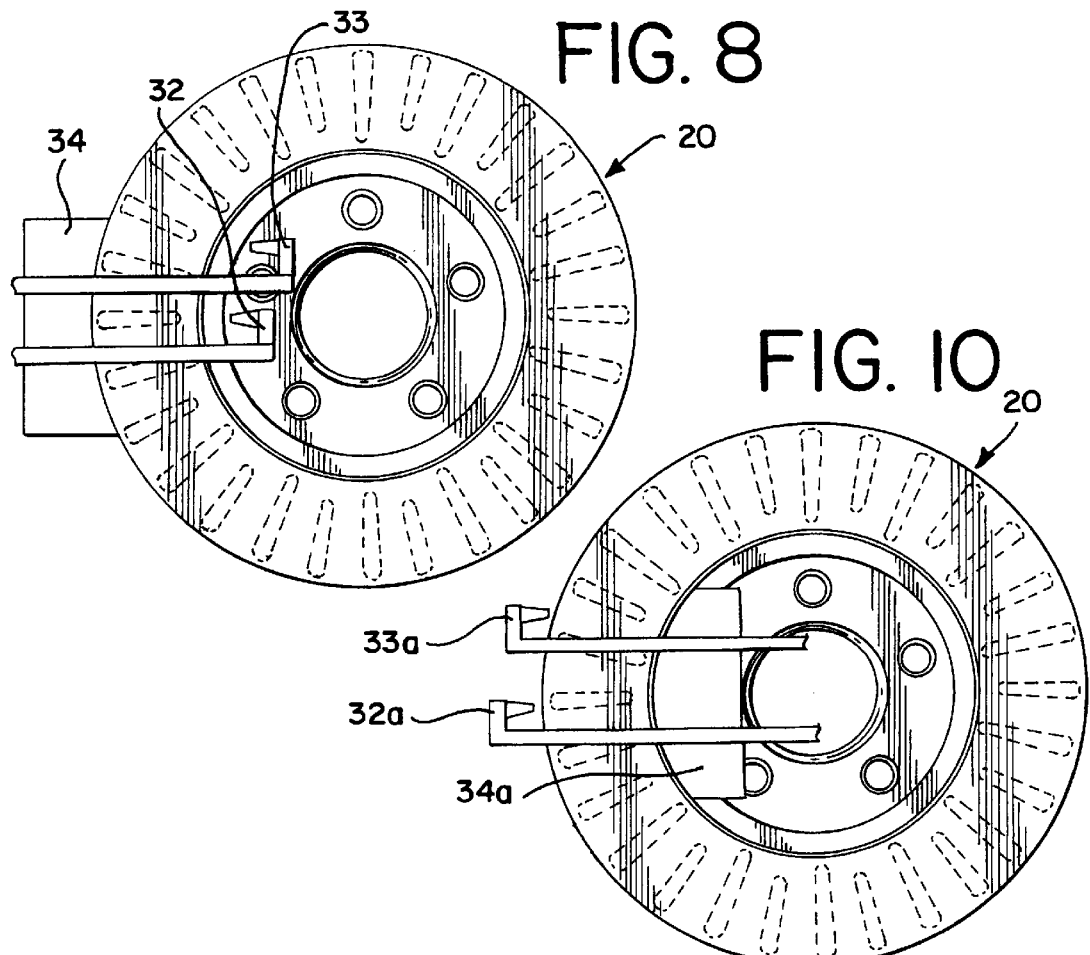

METHOD AND APPARATUS FOR COATING VENTED BRAKE ROTORS

DESCRIPTION

This invention relates in general to the application of coatings to vented brake rotors, and more particularly to the application of a corrosion protection coating to the surfaces defining the vents of the rotors, and still more particularly to the method and apparatus for automatically coating the vents of brake rotors and for precision spraying of the exterior of the rotors.

BACKGROUND OF THE INVENTION

Heretofore, it has been well known to apply corrosion coatings to brake rotors by using the conventional spray, dip-spin and dip-drain coating processes.

Traditional dip-spin and dip-drain coating processes require immersing the workpiece or part in the coating material, thereafter removing the part from the coating material and either spinning the part to remove the excess material or to allow the part to have the excess material drained from the part. Such processes normally produce non-uniform coating thicknesses, material striations on the rotor's outer surface area, and pooling of coating material in the vented areas of the rotor. Moreover, different coating thickness variations cannot be uniformly and consistently applied to different surfaces and areas of the rotors.

It is also not possible to economically mask brake rotor surface areas prior to the use of conventional dip drain and dip spin processes.

Accordingly, in order to overcome the coating thickness variations of different areas on the rotors, as well as the pooling of material, it becomes necessary to conduct costly rework operations such as a secondary operation to grit blast material from these areas after the part is coated to remove material from areas not desired to be coated. Moreover, the coating problems occurring with the dip-spin and dip-drain processes often interferes with corrosion performance and operational functionality of the brake rotors. Additionally, the brake rotor appearance or aesthetics are adversely affected.

Conventional spray processes do not have the capability to assure complete and uniform material coverage with the vented areas of a vented brake rotor which ultimately materially affects the corrosion protection effectiveness. Vented brake rotors often include forged and complex inside surface area configurations which do not easily retain the coating material used in conventional spray processes. Further, traditional air, airless and electrostatic spray processes do not have the ability to apply coating material to all of the rotor's vented upper, lower and side surfaces. Thus, traditional spray processes do not assure that the brake rotor manufacturer's corrosion protection requirements for the vented areas can be satisfied. Also, required functional performances cannot often be satisfied.

Further, conventional spray processes utilizing complex spray gun and nozzle configurations are unable to satisfactorily vary the coating thicknesses on different surfaces of the rotors.

Accordingly, conventional spray, dip drain and dip spin processes are unable to provide a cost effective high quality coating for vented brake rotors, and particularly they have failed to satisfy the increasing corrosion and aesthetic requirements of the automobile manufacturers.

SUMMARY OF THE INVENTION

The method and apparatus of the present invention overcomes problems in the prior known coating processes for brake rotors by uniformly coating surfaces of vented brake rotors and also providing different coating thicknesses for different areas without immersing the rotor into a coating material bath. The vent flooder and precision spray process of the present invention can produce different coating thicknesses in the rotor's vented areas, on its parking brake surfaces, on its hat areas, and other areas as required by the specifications of various manufacturers. The process of the present invention eliminates the production of material striations on the outer surface areas and the pooling of material within the rotor vented area, thereby improving the operational functionality of the rotor. The process of the present invention eliminates the need to utilize costly and ineffective secondary operations in order to meet the coating specifications of the manufacturers.

Further, the present invention, by providing uniform material coverage of the surfaces in the vents of a vented brake rotor, increases the corrosion protection of those vents. The process of the present invention employs several uniquely developed components to insure coating thickness variations that can be precisely maintained on different outside part surface areas to meet the manufacturer's process control specifications. The inherent performance and quality problems created by the conventional processes heretofore used are eliminated by the present invention.

Although the automatic vent flooding and precision spray system of the present invention is herein disclosed for the coating of surfaces of a vented brake rotor, it can be appreciated that the system may be used for a coating of other metal workpieces, particularly where the workpiece would include circumferentially arranged and substantially radially extending passageways desired to be coated with a suitable corrosion-inhibiting material.

It is therefore an object of the present invention to provide an improved method and apparatus for coating the various surfaces of vented brake rotors or other workpieces.

It is a further object of the present invention to provide a method and apparatus for automatic flooding of vents in a vented brake rotor for applying a uniform coating thickness to the surfaces of the vents, while also recovering or reclaiming all excess materials not adhering to the vent surfaces.

It is a still further object of the present invention to provide a new and improved process for applying corrosion protection to a vented brake rotor without immersing the brake rotor into a coating material.

It is a further object of the present invention to provide a manual or automatic method and apparatus for coating various surfaces of a vented brake rotor to provide a coated brake rotor with improved aesthetics corrosion performance and operational functionality.

It is a still further object of the present invention to provide an improved process for providing different coating thicknesses on a vented brake rotor.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of a conventional vented brake rotor;

FIG. 2 is a bottom plan view of the rotor of FIG. 1 with parts broken away to show vent vanes in section;

FIG. 3 is a transverse sectional view taken substantially along line 3—3 of FIG. 2;

FIG. 4 is a schematic flow diagram of a coating system according to the invention employing the manual method and apparatus for coating of a brake rotor;

FIG. 5 is a perspective view of a stand or a table for supporting and rotatably driving a vented brake rotor during the coating of the vent surfaces;

FIG. 6 is a somewhat enlarged further perspective view of the part of the apparatus shown in FIG. 5 and showing from the underside the positioning of the coating nozzle and air stream nozzle for applying the coating material and air stream to the inlet ends of the vents;

FIG. 7 is a perspective view of the cruciform-shaped fixture on which vented brake rotors can be mounted for rotation on the table shown in FIG. 5;

FIG. 8 is a bottom plan view of a vented brake rotor and showing in phantom the vanes of the rotor and also illustrating the positions of the coating and air nozzles at the inlet ends of the vanes and the suction nozzle at the outlet ends of the vanes;

FIG. 9 is a generally diagrammatic side elevational and somewhat sectional view of the system shown in FIG. 8;

FIG. 10 is a bottom plan view of a vented disc rotor and showing a system where the nozzles for applying the coating material and air stream are located on the outer periphery of the vents while the suction nozzle is located on the inner ends of the vents;

FIG. 11 is a diagrammatic side elevational and somewhat sectional view of the system in FIG. 10;

DESCRIPTION OF THE INVENTION

Figure 12:
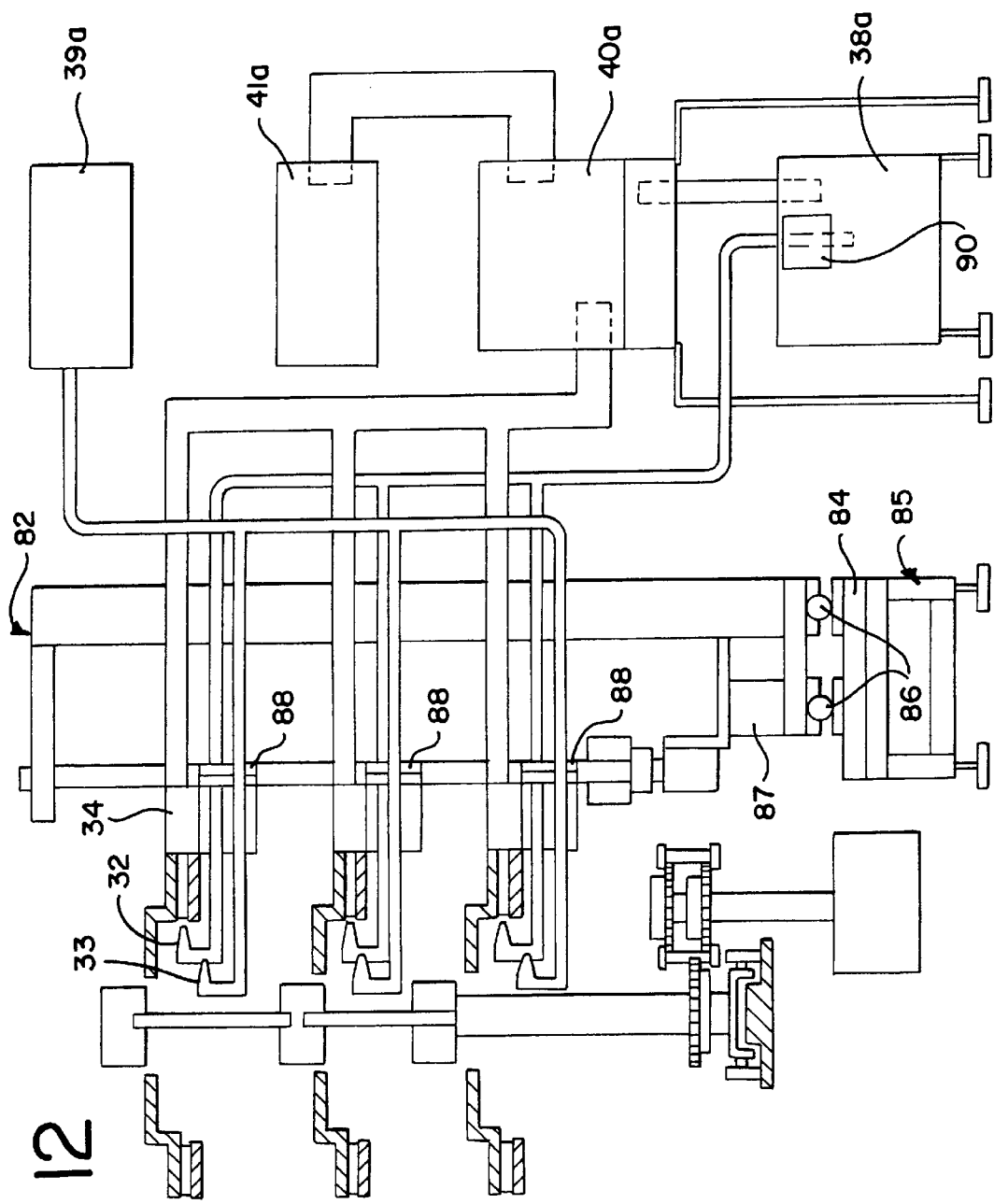
FIG. 12 is a schematic flow diagram of the automatic flooder system according to the invention for coating the vents of the vented brake rotor and taken transversely of the conveyer line carrying the holders for the brake rotors.

The present invention relates to the coating of metal surfaces and principally the application of a corrosion protective coating to metal surfaces of vented brake rotors of the type shown in FIGS. 1 to 3. Such rotors include a plurality of like configured air vents formed by surfaces defining air flow passages. More particularly, the present invention provides an improved method and apparatus for coating the various surfaces of a vented brake rotor in order to provide uniform thickness coatings, and the variation in thickness of coatings at different areas to meet the specifications of the manufacturers. The invention includes both the manual and automatic coating of the various surfaces of a vented brake rotor.

It will be appreciated that the rotors will be suitably cleaned prior to the application of a coating material. Preferably, the rotors are chemically cleaned by the use of conventional equipment and cleaning materials.

The method involves the rotation of the brake rotor during the coating of the vent surfaces and other surfaces so as to provide a uniform coating on the surfaces. Accordingly, the fixture on which the rotor is mounted is connected to a drive motor or mechanism for rotatably driving the fixture and the rotor mounted thereon at a desired speed. For coating the air vents, a coating material nozzle is located at one end of the vents together with an air nozzle, while a suction nozzle is located at the other end of the vents. Preferably, the coating nozzle and the air nozzle are located at the inlet ends of the vents, while the suction nozzle is located at the outlet ends of the vents, although this process may be reversed in certain cases as desired.

The coating nozzle discharges coating material at a predetermined pressure and flood rate to flood the vents with the coating material, while the suction nozzle functions to remove the excess material that does not adhere to the surfaces of the air vents and also to recover that excess material for further use while preventing spillover to other surfaces of the rotor. The air nozzle is arranged adjacent to the coating nozzle to assist in dispersing the coating material along the surfaces of the vents. Thus, during the rotation of the rotor, the coating process and recovery of the excess material coact to complete a coating process of the surfaces of the vents. The flow rate of the coating material, the pressure of the air stream, and the level of suction, together with the amount of time that the nozzles are operative, function to determine the thickness of the coating on the surfaces of the vents. Also, the speed of rotation of the rotor is coordinated with the functions of the nozzles to control coating thickness. The apparatus includes a stand on which the fixture is mounted and which would also include a motor for driving the fixture. The rotors would be manually mounted onto and removed from the fixture on the stand as needed to coat and/or further coat and cure the coatings.

The automatic method and apparatus for coating the vents of a brake rotor includes the utilization of a trolley conveyer having a plurality of fixtures mounted on interconnected trolleys on which rotors can be mounted for processing. The conveyer moves the rotors continuously along while adjacent to the conveyer, coating, air and suction nozzles are provided on fixtures that will move the nozzles into position relative to the rotors and along the conveyer as the rotors are advanced to perform the coating of the vents. Following completion of the coating of the vents, the nozzles are removed from the positions of the rotors and then returned to home position for applying coatings to additional rotors being moved along the conveyer. Moreover, the fixtures on which the rotors are mounted as they go through the coating station are rotated so that the rotors during the coating process are rotating to facilitate the proper coating of the air vents. Thereafter, the conveyer moves the rotors through a series of adjustably positioned spray guns for spray-coating the exterior surfaces of the rotors. Appropriate masking devices for masking portions of the rotor during spray coating are manually mounted on the rotors. Thereafter, the rotors are advanced through ovens for raising the temperature of the rotors and for curing the coatings on the rotors. It will also be appreciated that in an automated processing line, the rotors would first be subjected to a suitable cleaning operation, where the conveyer would advance the rotors through an automatic cleaning station. From the cleaning station, the rotors preferably would be advanced through the vent coating station, followed by moving the rotors through an oven to cure the coating on the vents. Thereafter, the rotors would be advanced along the conveyer through precision spray painting or coating stations to paint exterior surfaces. Masking fixtures would be manually mounted on the rotors as needed. The initial coating station would generally apply a base coating of material. Then the rotors would preferably be advanced through preheat and high heat stations to cure the base coating and then a cooling station. Thereafter, a top coat may be sprayed onto the rotors to complete the coating process.

It will be appreciated that any suitable corrosion inhibiting material may be used to coat the rotors. One type of suitable coating material is made and sold by Metal Coatings International Inc., including Dacromet 320, Dacromet 100 BL, and Dacrokote 450 coatings. Dacromet and Dacrokote are registered trademarks owned by Metal Coatings International Inc.

A typical vented brake rotor for purposes of illustrating the present invention is shown in FIGS. 1 to 3 and is generally designated by the numeral 20. The brake rotor includes a center hub 21 sometimes called a hat for mounting to a rotatable hub of a vehicle about an axis of rotation drawn by the arrow 22. However, the axis of rotation may be opposite of that shown by the arrow 22. A pair of disc-shaped parallel spaced apart braking members are attached to the hub and define an outboard braking surface 23 and an inboard braking surface 24. A plurality of circumferentially arranged vanes 25 and 26 are integrally formed with the disc-braking members and between the members to separate the members and define a plurality of circumferentially arranged and substantially radially extending air vents or air flow passages 27. The vanes 25 in this illustrated brake rotor are slightly longer than the vanes 26 although they may be of the same size. Moreover, these vanes extend diametrically relative to the axis of the rotor and are straight although they may be curved or of any other suitable shape. It should be appreciated that the vented brake rotor illustrated is only for purposes of generally illustrating the method and apparatus of the invention.

Each air flow passage includes an air inlet 28 and an air outlet 29, the air inlets being at the interior ends of the vanes, while the air outlets are at the outer ends of the vanes. Thus, the vents 27 include ends that may be defined as air inlets to the vents during operation on a vehicle while the other and outer ends of the vents constitute the air outlets 29. Cooling air through the vents enhances the braking efficiency of the brake rotor. To enhance the life of a brake rotor it is therefore important to have a corrosion protection on the surfaces forming and defining the vents. It will be appreciated that the one-piece brake rotor may be constructed from a one-piece casting of iron, aluminum or other suitable metal, as is conventional for brake rotors.

While the present invention embraces both a manual method and apparatus for coating brake rotors, it also embraces an automatic method and apparatus for coating brake rotors. In both arrangements or systems, the method and apparatus for coating the vents of the rotors utilize a coating nozzle, a suction nozzle, an optional air-stream nozzle, and means for rotating the rotor during the coating operation.

Referring now to FIGS. 8, 9, 10 and 11, a diagrammatic showing of how the coating, air and suction nozzles may be arranged relative to the rotor is illustrated. In FIGS. 8 and 9, a coating nozzle 32 is positioned to direct a stream of coating material toward the inlet ends 28 of the vents or air passages. Similarly, an air flow nozzle 33 is positioned adjacent to the coating nozzles for directing a stream of air toward the inlet ends of the vents. At the same time, a suction nozzle 34 is positioned at the outlet ends of the vents for applying a suction force to the outlet ends to assist in moving the coating material through the vents and also to recover the excess coating material not applied to the surfaces of the vents, thereby avoiding spillover to other surfaces of the rotor. While the air nozzle 32 may be optionally used in certain applications, preferably it is used at all times during the application of coating material to the vents. It will be understood that the coating material will be directed under pressure toward the vents and the end of the nozzle will be suitably positioned at the inlet ends of the vents to flood the vents with coating material. Further, it will be appreciated that the air nozzles will provide compressed air of a desired value in order to provide the optimum assistance in flooding the vents with the coating material. Finally, it will be appreciated that the suction nozzles will have a level of suction force such as to provide the assistance in moving the coating material through the vents and recovering the excess material which can be later used again. Thus, the coating, air and suction nozzles coact together to not only uniformly coat the interior surfaces of the vents but also to facilitate the recovery of excess material that is not applied to the surfaces as it moves through the vents. Further, the speed of rotation of the rotor is controlled in accordance with the conditions needed in order to provide the desired coating thickness in the vent areas.

While it is preferred that the coating and air nozzles be positioned at the interior of the rotors and pointed in a direction toward the inlets of the air vents, it can be appreciated that for certain applications it may be desirable to place the coating and air nozzles to direct their coating material and air stream in toward the outlet ends of the vents, as shown by the embodiment of FIGS. 10 and 11. In this embodiment, the coating material nozzle 32a and the air nozzle 33a are disposed at the outer periphery of the rotor to direct the coating material and the air stream toward the outlet ends 29 of the vents. In this embodiment, the suction nozzle 34a is then mounted at the inlet ends 28 of the vents. In all cases, the suction nozzle or nozzles will be positioned as close as possible to the rotor vent inlets or outlets without interfering with the rotation of the rotors.

The flow diagram showing the system of applying the coating material is illustrated in FIG. 4 for the embodiment of FIGS. 8 and 9 wherein the coating material nozzle 32 is connected through suitable lines to a material feed system 38. It will also be noted that the air nozzle 33 for providing the air stream toward the inlet and the vents is connected through a suitable line to an air compressor 39. The suction nozzle 34 is connected through a suitable line to a material reclaim system 40 which in turn is connected to a vacuum system 41 for reclaiming and recovering the excess coating material not used during the flooding of the air vents of the rotor. Additionally, a turn line 42 is provided from the material reclaim system to feed the reclaim material back into the material feed system 38.

The vented brake rotor 20 is diagrammatically illustrated as being mounted on a fixture or spindle 44 that is connected through suitable gearing to a variable speed drive 45 for rotatably driving the spindle and the rotor during the coating process. The variable speed drive is controlled by a control panel 46 to provided the desired speed of the rotor during any coating operation.

Referring to FIGS. 5 to 7, an apparatus for mounting and driving a vented disc rotor to accomplish the manual method of coating the vents is illustrated, which includes a table or stand 48 having a plurality of legs 49 to support the stand on the floor. The spindle 44 is suitably rotatably supported on the table 48 and extends upwardly from the table and includes a fixture 52 of a cruciform shape. The cruciform elements are carried on a disc 53 such that the cruciform elements are received in the opening 30 of the disc when the disc is mounted on top of the fixture 52 and resting against the disc 53. A fixture of any suitable form may be provided, and it may depend on the form of the rotor. Thus, the brake rotor can easily be mounted onto and be removed from the fixture 52 and held in proper place during the time that it is undergoing the coating of the surfaces defining the vents. The spindle or shaft 44 extends below the table 48 and includes a sprocket 55 aligned with a sprocket 56 and interconnected by a chain 57. The sprocket 56 is mounted on the shaft of a variable speed motor 58 supported below the table 48. Thus, the variable speed motor 58 drives the sprocket 56 and through the endless chain 57 the sprocket 55 on the spindle or shaft 44 on which the fixture 52 is mounted for receiving a vented brake rotor. The control 59 is provided on top of the table 48 in order to control the speed of the variable speed motor 58 and the speed of the rotor.

The material feed or coating nozzle 32 is connected to a line 61 and in turn to a manifold 62 mountable on the table in a suitable manner for adjustment purposes so that it may assist in adjusting the position of the material feed nozzle 32 relative to the particular vented disc rotor being coated. Similarly, the air nozzle 33 is connected to an air line 63 and which in turn would be connected to the air compressor. The air line would be such that it could suitably support the air nozzle in position as shown, particularly in FIG. 6.

The suction nozzle 34 is supported by an arm 64 that is suitably carried on an adjustable bracket 65 for adjustably positioning the suction nozzle 34 adjacent the perimeter of the vented disc rotor. A plurality of suction lines 66 extends from the suction nozzle 34 and to the material reclaim system 40 and the vacuum system 41. Once the positions of the nozzles are set for a given rotor, they need not be moved during the coating of any number of rotors.

A further control 67 is provided adjacent the control 59 for the operator to use in connection with the controlling the material feed, suction and air nozzles. Accordingly, the operator would manually mount a vented disc rotor onto the fixture 52 and properly position the coating material nozzle and the air nozzle as well as the suction nozzle and then operate the controls 59 and 67 to rotate the rotor and then to apply the coating material through the coating nozzle as well as the air stream through the air nozzle and also to allow the suction nozzle to recover the excess material not applied to the surfaces of the air vents of the rotor. At the conclusion of the coating process, the operator would remove the vented rotor from the fixture and then transfer the rotor to another fixture for purposes of applying coating material to the exterior surfaces as desired before the rotor would be subjected to heat for curing the coating material on the rotor.

The automatic vent flooder of the present invention is shown in FIGS. 12 to 16 and serves to flood the rotor's internal air vent surface area with coating material as the brake rotor is rotated along a motorized conveyer. A plurality of sets of rotors is supported on fixtures carried on the conveyer, and when a set of rotors is in position parallel to the flooding apparatus along the conveyer, the apparatus simultaneously injects and removes coating material to and from the rotor's internal vented surface areas while coating the air vent surfaces. It will be appreciated that the material flowing into an air vent or passageway is uniformly dispersed along a vent's inside surface area by applying air pressure to the material while it fills the vent's inner cavities. During this time material is extracted from the vent cavities by a suction nozzle driven by a vacuum system.

Accordingly, the air vents of the rotor are then uniformly and completely coated with material while preventing material spillage from occurring on the brake rotor's external surface area. The thickness of this coating may be on the order of 5 to 8 mils (0.127 to 0.203 mm) depending on the surface finish and the specifications of the user. This produces an economical and more efficient use of the coating material.

Inasmuch as a plurality of rotors is arranged in stacked relation or rather in vertically spaced apart relation, a plurality of flooding devices is used for simultaneously coating the air vents of a plurality of rotors. It will be appreciated that the material flow, that is, the rate of coating material flowing from the coating nozzle, the time period of the material flow, the air pressure and the vacuum suction, together with the rotational speed of the brake rotor, can be varied independently to accommodate vent sizes and configurations, and to obtain the desired coating thickness on the vent surfaces of the rotor. Accordingly, precise and complete material coverage within the vents is assured. The coating nozzle includes a discharge opening that will produce a stream of coating material, preferably like a ribbon.

Thereafter the automatic process uses precision control spray equipment to coat the brake rotor's outside surface areas. The thickness of exterior surfaces may be on the order of 2 to 4 mils (0.051 to 0.012 mm). This precision control equipment permits the application of varying thicknesses of coating material at varying locations on the brake rotor's outside surface areas. For example, it is possible to coat the rotor's hub or hat area with a material of different thickness than that of the braking surface area. The automatic process permits the use of fixture masks that may be easily disposed on the rotors to prevent the coating of outside surface areas such as the parking brake surface area where material coverage could potentially impact the brake rotor's operational functionality, or to mask other surfaces.

Following the spray coating of the outside surface areas of the rotors, the rotors are conveyed through an oven to provide sufficient heat to the rotors and the coating to cure the coatings. The oven or ovens are capable of curing different coating materials used on brake rotors of varying size and weight. For example, the ovens are capable of heating the rotors to a temperature of between 610° and 650° C. as the rotors pass through over a time period of ten to fifteen minutes in order to obtain the proper curing of the coating material.

The automated conveyer and part rotater, shown in FIGS. 12 to 16, includes a plurality of trolleys 70 interconnected together and movably guided along a track 71. While each trolley is shown to include a pair of rotatably supported sprockets 72 and 73, it will be appreciated that each trolley may be provided only with a single rotatably supported sprocket if desired. The sprocket 72 on each trolley has supported thereon an upstanding vertical shaft 74 carrying a plurality of fixture pins 75 for receiving and supporting a plurality of vented brake rotors 20 in superposed spaced apart relation. The sprocket 72, when connected to the fixture pins 75 and the shaft 74, rotate the fixture pin and fixtures in order to rotate the workpieces or parts mounted on the fixtures as they move through various steps in the coating process. It will be appreciated that the speed of the conveyer can be precisely timed to increase or decrease the number of cars that can be processed over a given period of time. Once the rotors are loaded onto the conveyer, there is no manual labor involved until the parts are unloaded and inspected before a shipment. At various stations along the conveyer, part rotaters are included for the purpose of rotating the spindle or fixture pins on which the rotors are mounted during the application of a coating. One of the rotater apparatus is provided to rotate the fixture and the brake rotors while the flooder apparatus applies coating material to the vents of the rotors and another rotater apparatus is located at a station where the fixtures and rotaters can be rotated as the outside surface areas of the rotors are precision spray coated. Each part rotater is independently controlled and to provide the proper speed of the rotor. By adjusting the speed of the conveyer the rotational speed of the fixture pin and parts may be changed. Further, adjustments can be used to vary the material coverage of the rotor's surface areas during both the vent flooding stage and the precision spray stage of the process.

A driven chain 77 located alongside of the conveyer is provided to engage the fixture pin's sprockets 72 to rotate the rotors on the fixtures while a coating operation is being performed. The chain 77 is driven around longitudinally spaced apart sprockets 78 and 79 by a suitable motor such as a motor 80 shown in FIG. 14. So as the conveyer with the rotatable fixture pins and rotors are advanced along the part rotater of the chain 77, the rotors will be rotated at a desired speed. The speed of the chain may be increased or decreased, as well as the speed of the conveyer carrying the fixture pins, in order to obtain the proper speed of rotation of the rotors.

At the station where the part rotater is located to rotate the fixture on which the rotors are mounted the vent flooder device is mounted adjacent to the conveyer to accomplish the flooding of the vents with the coating material as previously described. The vent flooder device is generally indicated by the numeral 82 and shown in FIGS. 12 and 13. This vent flooder device 82 is mounted adjacent to the automatic conveyer and automatic part rotater and automatically tracks the rotors on the conveyer through a suitable control system. It is synchronized with the automatic conveyer to engage the various vent flooder holder devices after a predetermined number of rotors is recognized. The vent flooder is employed to apply suitable coating material to the inside of each rotor's vented areas.

The automatic vent flooder operates to first move each vent flooder device holder into position either beneath a rotor or above a rotor, depending upon location of the rotor and its vented areas. This positioning will only occur after a set number of rotors has moved into position along where the vent flooding apparatus is located. Once this position is completed, each vent flooder device holder engages a vent flooding device which continues to follow the rotors along the automatic conveyer path until the vent flooding device operations are complete. Following the completion of the vent flooding operations, the vent flooder holding devices are then retracted or moved away from the rotors and the conveyer line and thereafter repositioned to their original home or starting position along the conveyer line before engaging and performing functions on the next set of rotors. All movements toward and away from the rotors and in parallel with the conveyer are controlled by using air cylinders, ball screws, slide and microprocessor components.

Figure 13:
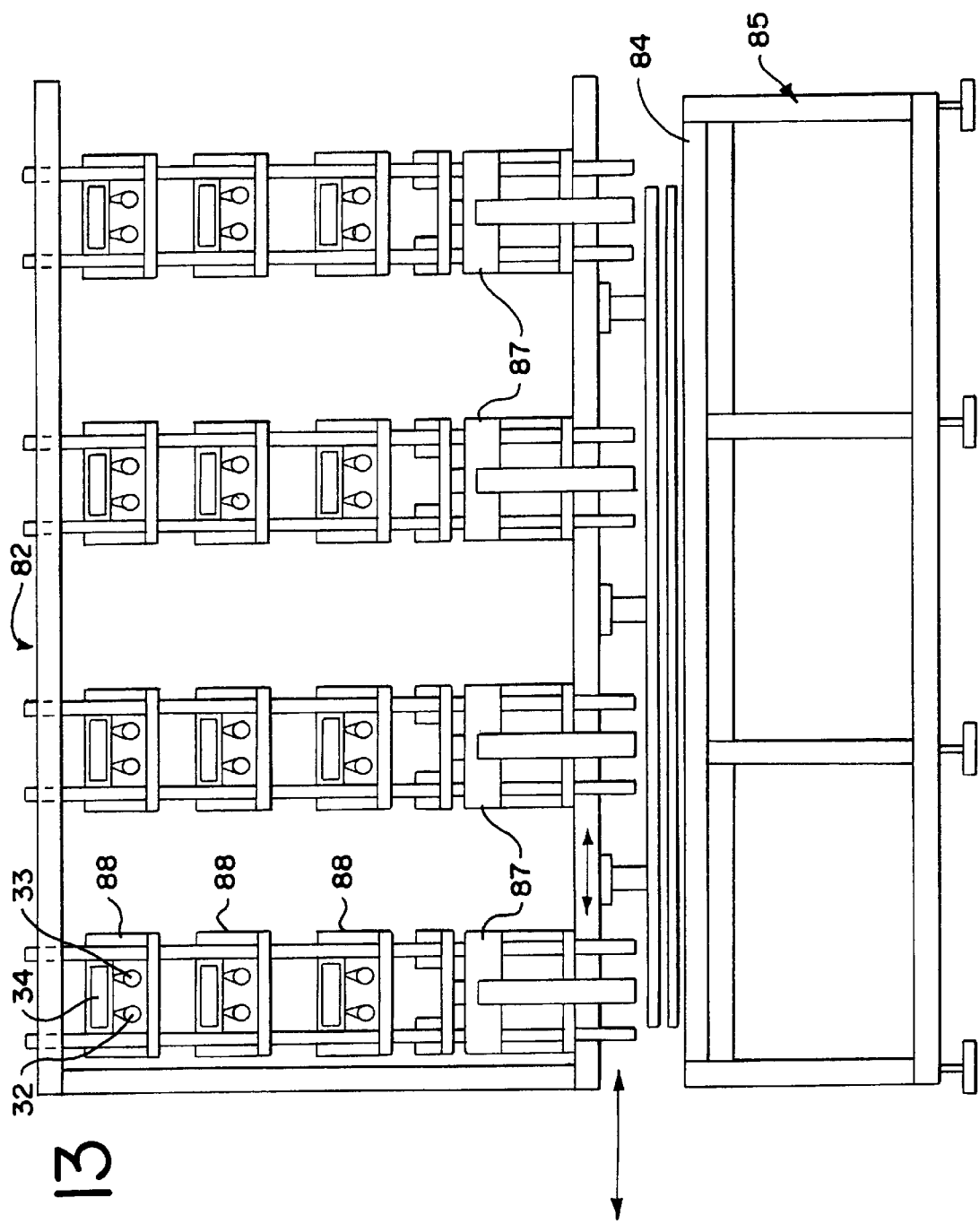
FIG. 13 is a longitudinal diagrammatic view of the automatic vent flooder device according to the present invention illustrating a plurality of flooding devices for coating rotors moving along a conveyer and looking at the side of the conveyer mounting the nozzles.
Figure 14:
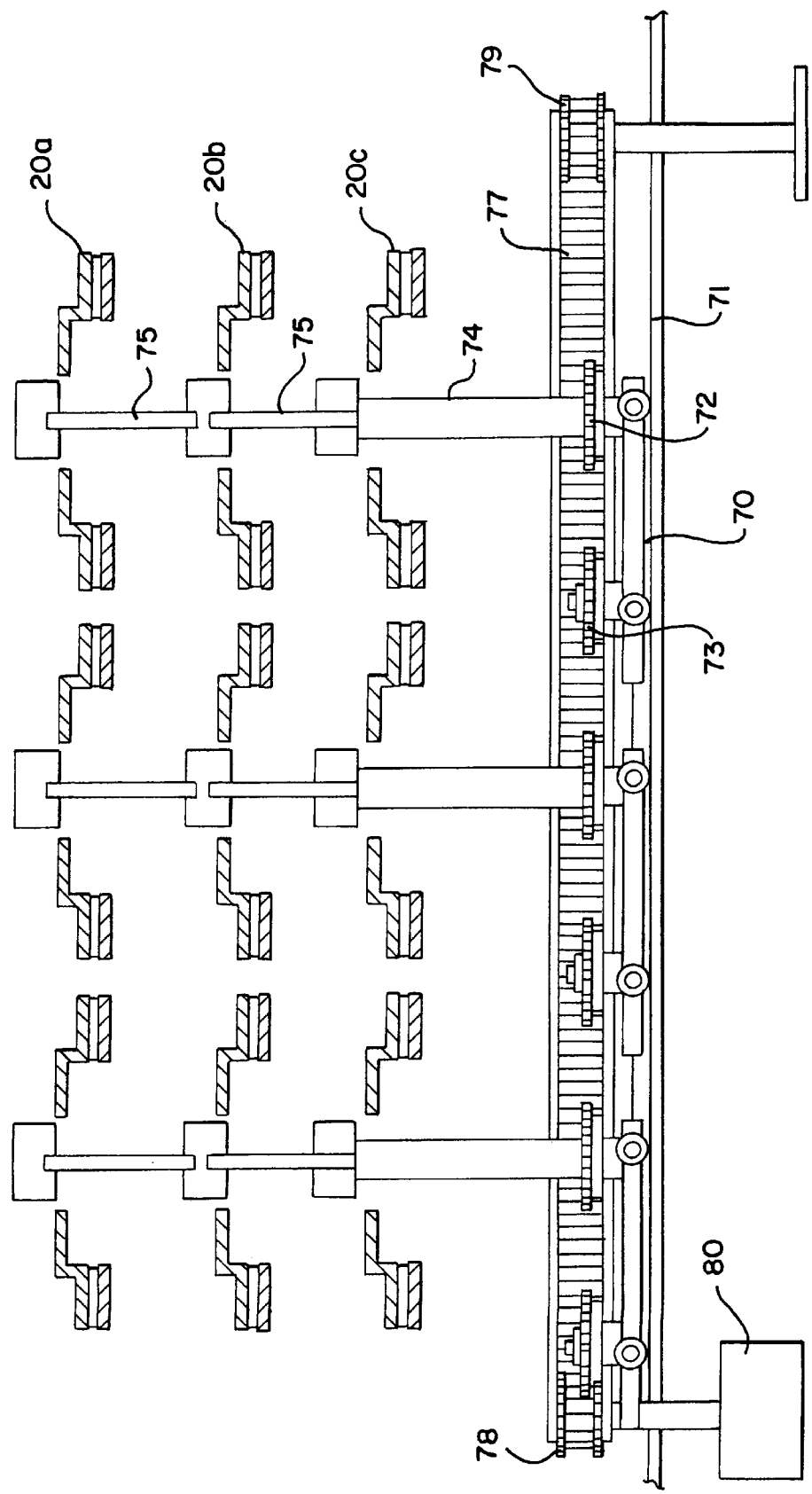
FIG. 14 is a diagrammatic view of the conveyer and illustrating the device for rotating the device for the brake rotors.
Figure 15:
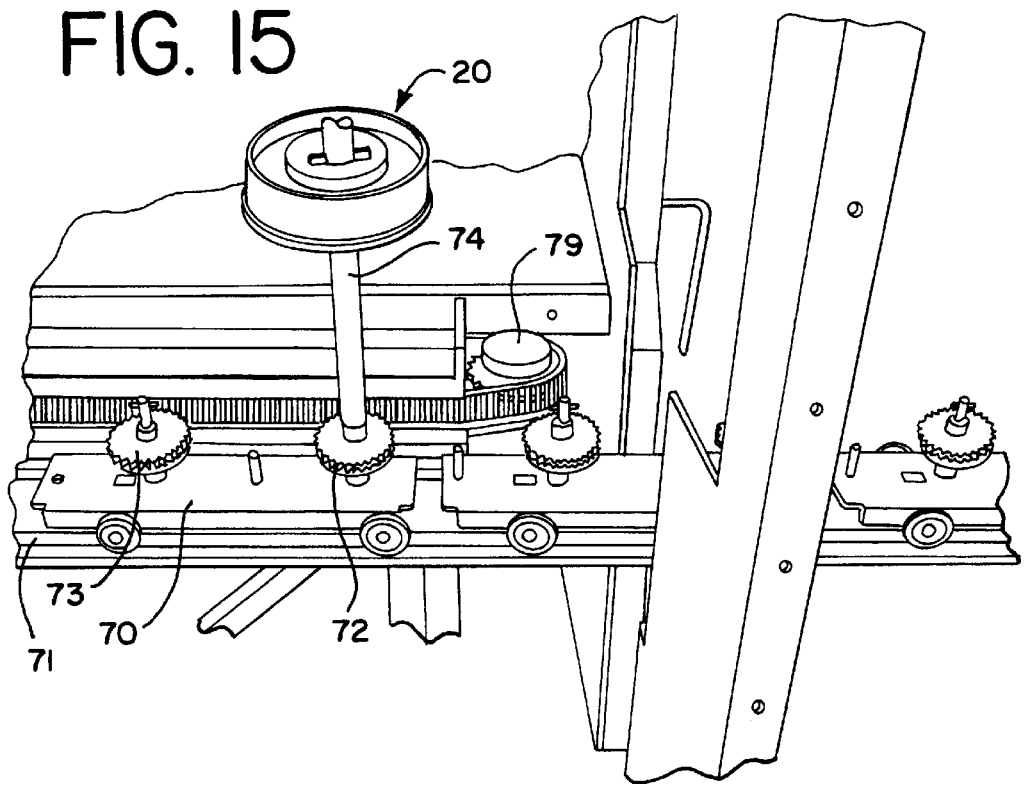
FIG. 15 is a fragmentary perspective view of the conveyer showing a partial rotor supporting fixture and illustrating the manner of rotating the rotor during travel along a conveyer.
Figure 16:
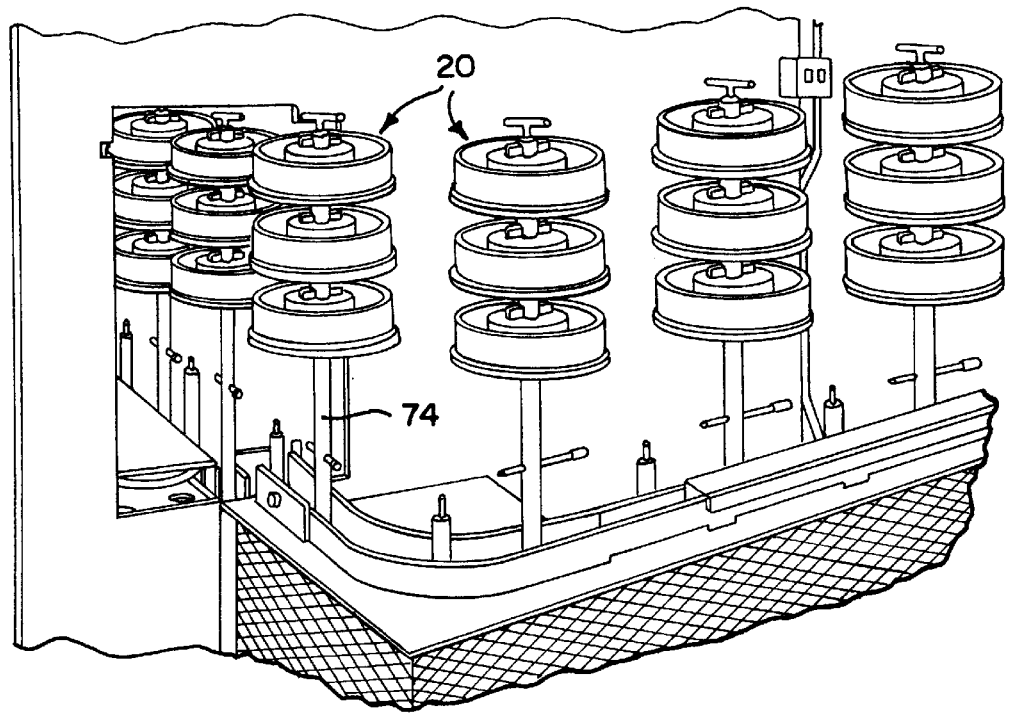
FIG. 16 is a further diagrammatic view of the conveyer and fixtures for holding a plurality of rotors.

The vent flooder device 82, as shown in FIGS. 12 and 13, is mounted on a table 84 supported on the floor by a suitable frame 85. The table includes a set of slide rails 86 having attached thereto a plurality of saddles 87. The vent flooder device shown in the drawings in FIG. 13 includes four saddles 87 and three vent flooder device holders 88 per saddle, which gives the device the capability of simultaneously vent flooding 12 rotors. It can be appreciated that by adding the slide to the slide rail's length and increasing the number of saddle attachments and increasing the number of part flooder device holders, it is possible to increase the number of parts that can be flooded simultaneously. It is also possible to increase the number of vent flooder device holders if additional rotors are mounted vertically on a fixture. Each vent flooder device holder 88 is automatically programmed to move up and down independently along the frame of the device and the length of travel is controlled by an air cylinder. This allows each vent flooder device holder and its associated devices to be independently and precisely positioned to meet each rotor's coating requirements. Speed and travel path of the saddles 87 and the vent flooder holders are controlled by a ball screw drive that is synchronized with the conveyer speed and the rotors.

Each vent flooder device holder 88 includes a material feed nozzle 32 connected by flexible tubing to an automated feed system 38*a*. A pump 90 is located within the material feed system 38*a* to deliver the material from the system container of the tubing to the feed nozzle 32 at a desired flow rate. The size and orientation of the nozzle is flexible so that it can be properly positioned to provide the desired performance. As illustrated in the schematic diagram of FIG. 12, a plurality of feed nozzles is connected to the single material feed system 38*a*. It should also be appreciated that different sizes and shapes of nozzles can be used to support sizes and shapes of vented areas and also to control the amount of material to be dispersed to the vented areas. Further, the pump speeds can be regulated to control the amount of material being applied through the nozzles to the vents.

The compressed air nozzle 33 is positioned adjacent to the material feed nozzle 32 and serves to force air pressure onto the material as it enters the vented areas of the rotors. This air tends to disperse the material to the air vent's upper, lower and side surface areas and through to the vent's opening on the outer side. It is also possible to use multiple compressed air nozzles and vary the air pressure to each nozzle. Further, the use of different size and shapes of different nozzles will assure that consistent material dispersion, vent coverage, and pass-through material will be provided.

A vacuum nozzle 34 draws materials from the vents, controls the amount of material that is exiting the vented areas. This suction action also spreads the material into the vent's upper, lower and side surface cavities. After any excess material drawn from the vents is reclaimed and recycled to the material feed container 40*a*. It will be appreciated that the number of suction nozzles may be varied as well as the sizes and shapes to provide the proper material dispersion and vent coverage for the air vents. Thus, the sizes and shapes of the nozzles, coupled with precise control over the amount of vacuum power, guarantees that the vent coverage will be provided without spill-over to the external surface areas of the vented rotor.

The combined actions of the material feed nozzle, the compressed air nozzle, and the suction nozzles ensure complete and uniform coverage of the material within the rotor vented areas, while also preventing the material from pooling inside the vented areas and from material spilling over the rotor's external surface areas.

It will be further appreciated that the vent flooder holder devices 88 are controlled by the use of electronic controls and external sensors. A microprocessor is connected to different external sensors to determine the vertical and horizontal movement of a vent flooder device holder before commencing the operation of the material coating air stream and suction devices and to regulate the start and stop of the material to the air flow of a brake rotor's vented areas. Additionally, the sensors control the velocity and inches of water drawn by the material vacuum suction system 41*a* as well as determining whether a rotor is loaded on a particular holder before a vent flooder holder device is placed into operation.

Further, it should be appreciated that all process parameters are adjustable depending upon the coating materials used and the specifications required by the manufacturer for a particular vented rotor configuration. So any size brake rotor may be accommodated with a particular coating specification of the manufacturer.

While not shown, the precision spray apparatus would include a set of conventional spray guns that can be appropriately positioned and controlled to provide precise coating thicknesses on the exterior surfaces of the vented rotors. Conventional spray guns are mounted so that they may be quickly adjusted for different rotor outside surface area coating thickness specifications and locations. Coating materials are fed to the spray guns using a single container feed system that insures uniform spray pattern consistency.

In view of the foregoing, a new and improved method and apparatus for applying corrosion protective materials to vented brake rotors and other parts is provided by the invention to assure uniform coating thicknesses and to maximize the efficiency of using coating materials.

It will be understood that modifications and variations may be effected without departing from the scope of the novel concepts of the present invention, but it is understood that this application is to be limited only by the scope of the appended claims.

What is claimed is:

1. The method of applying a corrosion protective coating to surfaces defining the air vents in a vented brake rotor wherein the rotor includes a plurality of circumferentially spaced and generally radially extending air vents having inwardly disposed air inlets and outwardly disposed air outlets, said method comprising the steps of:

rotating the rotor, directing a stream of coating material toward the air inlets or outlets, applying a stream of air along with the coating material toward said air inlets or outlets, applying a suction force to the opposite of the air inlets or outlets from which the coating material and air stream are directed, and curing said coating.

2. The method of claim 1, wherein said steps of directing a coating material and applying an air stream are directed toward said air inlets and said application of suction is at the air outlets.

3. The method of claim 1, wherein said step of rotating the rotor includes mounting the rotor on a vertically arranged rotatable spindle and driving said spindle to provide the desired rotational speed of said rotor.

4. The method of claim 1, wherein said step of rotating the rotor includes mounting the rotor on a vertically arranged rotatably mounted spindle carried on a conveyor and driving said spindle to provide the desired rotational speed of said rotor during the steps of spraying the coating material, applying the air stream and applying the suction.

5. The method of claim 2, wherein said step of directing a coating material toward said air inlets includes positioning a coating discharge means adjacent the air inlets of the vents, and feeding coating material under pressure to said coating discharge means.

6. The method of claim 5, wherein said coating discharge means includes a coating nozzle.

7. The method of claim 6, wherein the step of applying a stream of air toward said air inlets includes the step of positioning an air discharge means adjacent the air inlets, and supplying air pressure to said air discharge means.

8. The method of claim 7, wherein said air discharge means includes an air nozzle.

9. The method of claim 8, wherein said step of applying suction to the air outlets includes the step of positioning suction means adjacent the air outlets and supplying a suction force to said suction discharge means.

10. The method of claim 9, wherein said suction discharge means includes a suction nozzle.

11. The method of claim 10, wherein said coating nozzle is mounted on a movable holder for selectively placing the coating nozzle between coating and non-coating positions.

12. The method of claim 11, wherein said air nozzle is mounted on a movable holder for selectively placing the air nozzle between air application and non-air application positions.

13. The method of claim 12, wherein said suction nozzle is mounted on a movable holder for selectively positioning the suction nozzle between suction and non-suction positions.

14. The method of claim 10, wherein said coating nozzle and air nozzle are mounted on a common holder for selectively placing the nozzle between coating/air application and non-coating/non-air application positions.

15. The method of claim 13, wherein steps of positioning the coating and air nozzles into coating and application positions and the positioning of the suction nozzle into suction position is coordinated for the application of a uniform coating on the vent surfaces.

16. The method of claim 1, wherein said step of curing includes applying heat to said rotor.

17. The method of coating the surfaces defining the air vents in a vented brake rotor wherein the vents include air inlets and air outlets comprising the steps of:

mounting a vented brake rotor horizontally on a rotatable spindle with the outboard side of the rotor facing upwardly and the inboard side facing downwardly, mounting a coating nozzle at the inboard side of the rotor adjacent one of the inlets or outlets of the vents for directing a coating material toward the vents, mounting an air nozzle adjacent the coating nozzle to direct a stream of air toward one of the vent inlets or outlets, mounting a suction nozzle adjacent the opposite of the inlets or outlets from the coating and air nozzles to apply a vacuum, providing a source of coating material for the coating nozzle, air pressure for the air nozzle and suction for the suction nozzle, rotating the spindle and rotor, and coordinating the coating, air and suction sources to provide a uniform coating of material on the vent surfaces, and curing the coated material.

18. The method of applying a corrosion protective coating to surfaces defining the air vents in a vented brake rotor wherein the rotor includes a plurality of circumferentially spaced and generally radially extending air vents having inwardly disposed air inlets and outwardly disposed air outlets, said method comprising the steps of:

rotating the rotor, directing a coating material toward the air inlets or outlets, applying a suction to the opposite of the air inlets or outlets from which the coating material is directed, and curing said coating.

* * * * *